United States Patent
Ohmura et al.

(10) Patent No.: US 10,960,888 B2
(45) Date of Patent: Mar. 30, 2021

(54) CONTROL METHOD FOR VEHICLE AIR CONDITIONING, AND VEHICLE AIR CONDITIONING DEVICE

(71) Applicant: Nissan Motor Co., Ltd., Yokohama (JP)

(72) Inventors: Yasushi Ohmura, Kanagawa (JP); Masahiro Oomori, Kanagawa (JP); Nobuto Morishima, Kanagawa (JP); Seiji Katsuma, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/606,256

(22) PCT Filed: May 18, 2017

(86) PCT No.: PCT/JP2017/018616
§ 371 (c)(1),
(2) Date: Oct. 18, 2019

(87) PCT Pub. No.: WO2018/211647
PCT Pub. Date: Nov. 22, 2018

(65) Prior Publication Data
US 2020/0398852 A1    Dec. 24, 2020

(51) Int. Cl.
*B60W 30/18*    (2012.01)
*B60H 1/00*    (2006.01)
(Continued)

(52) U.S. Cl.
CPC ... *B60W 30/18181* (2013.01); *B60H 1/00642* (2013.01); *B60H 1/00764* (2013.01);
(Continued)

(58) Field of Classification Search
None
See application file for complete search history.

(56) References Cited

U.S. PATENT DOCUMENTS 7,177,742 B2 * 2/2007 Makishima ............ B60H 1/322
62/133
2003/0196442 A1 * 10/2003 Wakisaka .............. F25B 49/022
62/133
(Continued)

FOREIGN PATENT DOCUMENTS

CN    102822500 A    12/2012
CN    103921648 A    7/2014
(Continued)

*Primary Examiner* — Nicholas K Wiltey
(74) *Attorney, Agent, or Firm* — Global IP Counsels, LLP

(57) ABSTRACT

A vehicle air-conditioning device is provided for controlling a vehicle air-conditioning of a vehicle in accordance with a control method. The air-conditioning compressor is stopped for a first time period after a brake pedal transitions from an operated state to a non-operated state when negative pressure inside a vacuum servo is insufficient relative to a predetermined pressure while an air-conditioning compressor is operating, and The air-conditioning compressor is stopped for a second time period after the acceleration pedal has come to be in a non-operated state when an acceleration pedal is operated before the first time period elapses.

6 Claims, 3 Drawing Sheets

(51) Int. Cl.
    *B60W 10/06*        (2006.01)
    *B60W 10/18*        (2012.01)
    *B60W 10/30*        (2006.01)

(52) U.S. Cl.
    CPC ............ *B60W 10/06* (2013.01); *B60W 10/18* (2013.01); *B60W 10/30* (2013.01); *B60W 2510/0671* (2013.01); *B60W 2540/10* (2013.01); *B60W 2540/12* (2013.01); *B60W 2555/20* (2020.02)

(56) References Cited

U.S. PATENT DOCUMENTS

| | | | |
|---|---|---|---|
| 2013/0074537 A1* | 3/2013 | Rollinger | B60H 1/00807 62/228.1 |
| 2020/0031202 A1* | 1/2020 | Jung | B60H 1/3216 |
| 2020/0180397 A1* | 6/2020 | Jung | B60H 1/00764 |
| 2020/0398851 A1* | 12/2020 | Ohmura | B60W 10/18 |

FOREIGN PATENT DOCUMENTS

| | | |
|---|---|---|
| CN | 103994617 A | 8/2014 |
| JP | 2003-104046 A | 4/2003 |
| JP | 2008-208729 A | 9/2008 |
| JP | 4465940 B2 | 5/2010 |
| JP | 2012-35724 A | 2/2012 |
| JP | 2013-203120 A | 10/2013 |
| JP | 2015-47884 A | 3/2015 |
| JP | 2015-63146 A | 4/2015 |

\* cited by examiner

CONTROL METHOD FOR VEHICLE AIR CONDITIONING, AND VEHICLE AIR CONDITIONING DEVICE

CROSS-REFERENCE TO RELATED APPLICATIONS

This application is a U.S. national stage application of International Application No. PCT/JP2017/018616, filed on May 18, 2017.

BACKGROUND

Technical Field

The present invention relates to a control method for controlling air conditioning of a vehicle provided with an air-conditioning compressor, and to a vehicle air-conditioning device for a vehicle.

Background Information

A vehicle is disclosed in Japanese Laid-Open Patent Application No. 2015-47884 (Patent Citation 1) that has an air-conditioning compressor driven by an engine which is an internal combustion engine, and a vacuum servo in which negative pressure of an intake manifold of the engine is used to assist brake pedal force. Patent Citation 1 further discloses a technology in which when the negative pressure inside the vacuum servo is insufficient, the brake pedal changing from a pressed state to a released state is a trigger to stop an air conditioner for a predetermined amount of time, an engine load allotted to the air-conditioning compressor is reduced, and the negative pressure inside the vacuum servo is ensured.

SUMMARY

However, with the technology of Patent Citation 1, when an acceleration pedal is pressed down after, for example, a foot has been taken off the brake pedal, negative pressure inside an intake manifold decreases, and there is therefore a risk the negative pressure inside the vacuum servo cannot be ensured even when the air conditioner is stopped after the foot has been taken off the brake pedal.

An object of the present invention is to provide a method for controlling air conditioning for a vehicle and an air-conditioning device for a vehicle, with which air-conditioning functionality and brake performance can both be achieved.

To achieve the object described above, in the present invention, when the negative pressure inside the vacuum servo is insufficient relative to a predetermined pressure during operation of the air-conditioning compressor, the air-conditioning compressor is stopped for a first time period after the brake pedal transitions from an operated state to a non-operated state, and when the acceleration pedal is operated before the first time period elapses, the operation of the air-conditioning compressor is stopped for a second time period after the acceleration pedal has come to be in a non-operated state.

Consequently, when the brake pedal transitions from an operated state to a non-operated state, the air-conditioning compressor is stopped for a first time period, whereby negative pressure inside the vacuum servo can be ensured. When the acceleration pedal is operated before the first time period elapses, the air-conditioning compressor is stopped for a second time period after the acceleration pedal has come to be in a non-operated state, and negative pressure inside the vacuum servo can therefore be ensured even if the acceleration pedal is operated.

DETAILED DESCRIPTION OF THE EMBODIMENTS

Preferred embodiments for implementing an air-conditioning control process of the present invention will be described hereinbelow based on drawings.

First Embodiment

Figure 1:
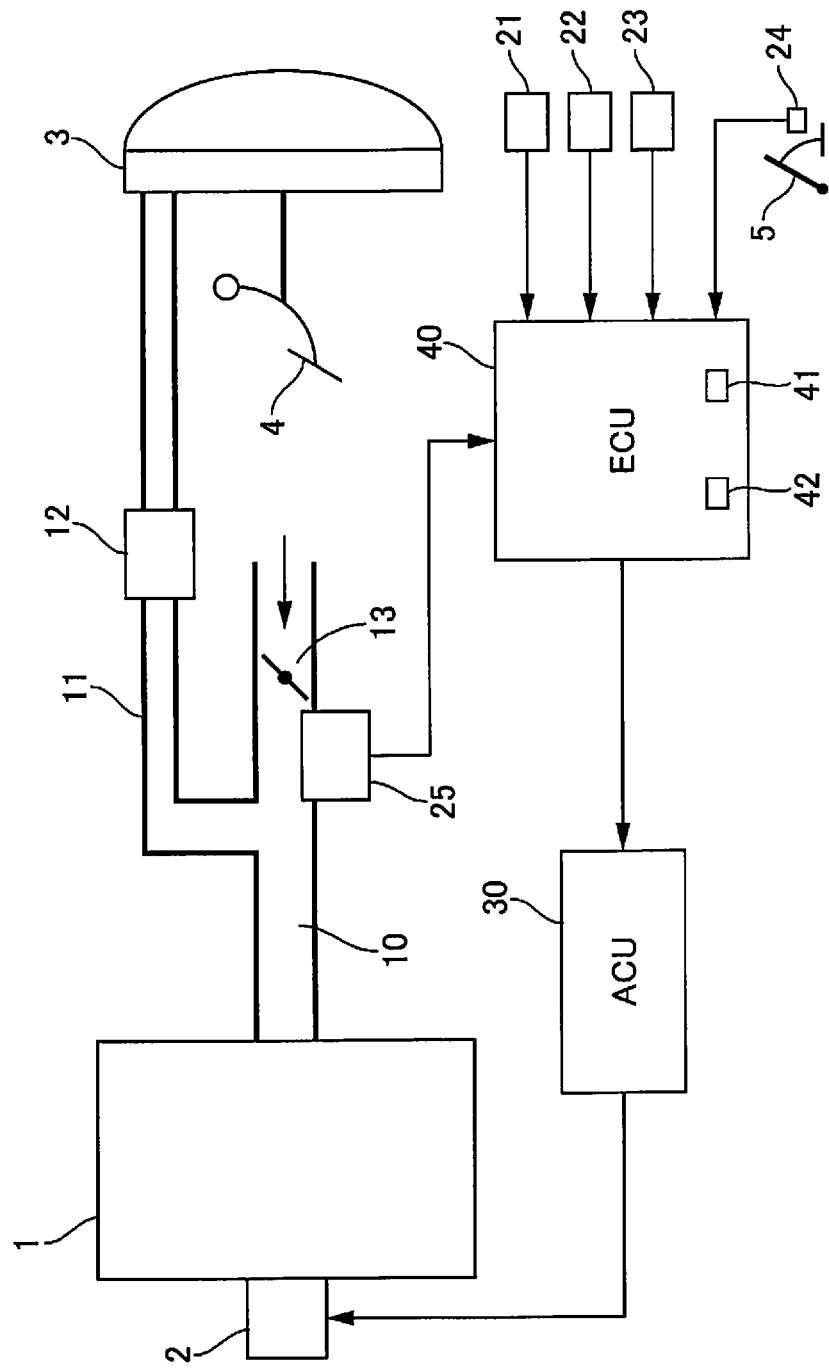
FIG. 1 is a system diagram of a vehicle to which an air-conditioning device for a vehicle of a first embodiment is applied.

FIG. 1 is a system diagram of a vehicle to which an air-conditioning device for a vehicle of the first embodiment is applied. An engine 1, which is an internal combustion engine, takes in air from an intake manifold 10. The intake manifold 10 is provided with a throttle valve 13, and an amount of air taken in is controlled in accordance with a position of an acceleration pedal 5 operated by a driver. On the intake manifold 10, between the throttle valve 13 and the engine 1, a negative pressure supply passage 11 is connected and an intake pressure sensor 25 is provided. The intake pressure sensor 25 detects negative pressure inside the intake manifold 10 (written hereinafter as PIM), and outputs the detected pressure to an engine control unit 40 (described hereinafter). The negative pressure supply passage 11 is connected to a vacuum servo 3.

The vacuum servo 3 is a negative pressure booster that assists stepping force applied to a brake pedal 4 by introducing negative pressure into a pressure chamber. A check valve 12 is provided over the negative pressure supply passage 11, and this check valve both allows air to flow from the vacuum servo 3 toward the engine 1 and prevents air from flowing from the engine 1 toward the vacuum servo 3.

When the engine 1 rotates, air is taken in from the intake manifold 10 by reciprocating motion of a piston; therefore, negative pressure is generated inside the intake manifold 10, and negative pressure inside the vacuum servo 3 is supplied. The vacuum servo 3 uses this negative pressure to assist the stepping force applied to the brake pedal 4. When a speed of the engine 1 decreases, negative pressure inside the intake manifold 10 is not generated, and the supply of negative pressure to the vacuum servo 3 is insufficient. When the brake pedal 4 is operated multiple times in this state, the negative pressure inside the vacuum servo 3 is consumed, and assisting force is insufficient. The magnitude of the negative pressure is described hereinafter as a relationship that is the same as that of the magnitude of pressure in terms of the absolute value thereof.

This air-conditioning device for a vehicle (also referred to hereinafter as "air conditioner") constitutes a vapor-compression refrigerant cycle provided not only with a wellknown compressor 2, but also with a condenser, an expansion valve, an evaporator, etc. The compressor 2 of the air conditioner is driven by the engine 1. Consequently, when the compressor 2 is operated, an engine load increases, the negative pressure inside the intake manifold 10 decreases, and the negative pressure that can be supplied to the vacuum servo 3 therefore also decreases.

The engine control unit 40 (referred to hereinafter as the ECU) calculates a target engine torque based on a requested torque corresponding to a position of the acceleration pedal 5 (referred to hereinafter as APO). When the acceleration pedal position APO is less than a predetermined value, a position of the throttle valve 13 is controlled so that the valve is open by only a very small amount, and an idling state is achieved. The ECU is equipped with an atmospheric pressure sensor 41 that detects atmospheric pressure (also referred to hereinafter as POP). A brake switch 21 outputs an ON signal to the ECU when the brake pedal 4 is operated, and an OFF signal to the ECU when the brake pedal 4 is not operated. An air conditioner switch 22 outputs an ON signal to the ECU when the driver desires the air conditioner to operate. A vehicle speed sensor 23 detects a vehicle speed VSP and outputs the detected value to the ECU. An accelerator position sensor 24 detects the driver's acceleration pedal position APO and outputs the detected value to the ECU.

The ECU controls the throttle valve 13 of the engine 1 and an injector, and also controls a running state of the engine 1 and an operating state of the compressor 2. The ECU has a negative pressure estimation unit 42 that estimates a vacuum servo negative pressure estimation value (referred to hereinafter also as the PMB*), which is the negative pressure inside the vacuum servo 3, based on the PIM and the POP. This makes installing a vacuum servo negative pressure sensor unnecessary.

An air conditioner control unit 30 (referred to hereinafter as the ACU) is a control device that performs air-conditioning control for a cabin interior. The ACU sends and receives various signals to and from the ECU, and controls the operating state of the compressor 2 based on the ON and OFF commands for the operation of the compressor 2 directed from the ECU. Within the ACU, a discharge capacity, etc., of the compressor 2 is controlled so that a set cabin interior temperature set by an occupant, etc., is reached.

Air-Conditioning Control During Brake Negative Pressure Request

Problems with a vehicle provided with the system of the first embodiment shall now be described. Concerning detection of negative pressure inside the vacuum servo 3, when a sensor that directly detects the negative pressure inside the vacuum servo 3 is provided instead of the negative pressure estimation unit 42 of the first embodiment, the air conditioner is stopped at the point in time when a negative pressure deficit is detected, and the air conditioner is preferably operated after negative pressure has been ensured. However, when a sensor that detects pressure directly is not provided and the negative pressure inside the vacuum servo 3 is estimated from the pressure inside the intake manifold 10 and the atmospheric pressure, highly precise estimation is difficult. This is because the check valve 12 is provided between the intake manifold 10 and the vacuum servo 3 and the same pressure state is not always maintained. Consequently, there is some divergence between the negative pressure estimation value and the actual negative pressure.

In view of this, when the estimation value of the negative pressure inside the vacuum servo 3 falls below a predetermined value, the air conditioner is be stopped via timer management for a time period during which negative pressure can be reliably ensured. When the driver presses on the acceleration pedal 5 while the air conditioner has been stopped, the throttle valve 13 opens. Even though the air conditioner has been stopped, negative pressure cannot be ensured inside the intake manifold 10, and negative pressure inside the vacuum servo cannot be ensured even if the air conditioner is stopped. Specifically, not only can negative pressure not be ensured, but due to the air conditioner stopping, there is a risk that air-conditioning performance will decrease and the occupants will experience discomfort. In view of this, when the air conditioner has been stopped by timer management and the acceleration pedal 5 is operated, the air conditioner is stopped again after operation of the acceleration pedal 5 has ended. Specifically, even when the estimation value of the negative pressure inside the vacuum servo 3 has diverged from the actual negative pressure, both the negative pressure of the vacuum servo 3 and air-conditioning performance can be ensured by repeatedly stopping and operating the air conditioner based on timer management and in accordance with a predetermined condition. A control flow by which this effect is achieved is described below.

Air-Conditioning Control Process During Brake Negative Pressure Request

Figure 2:
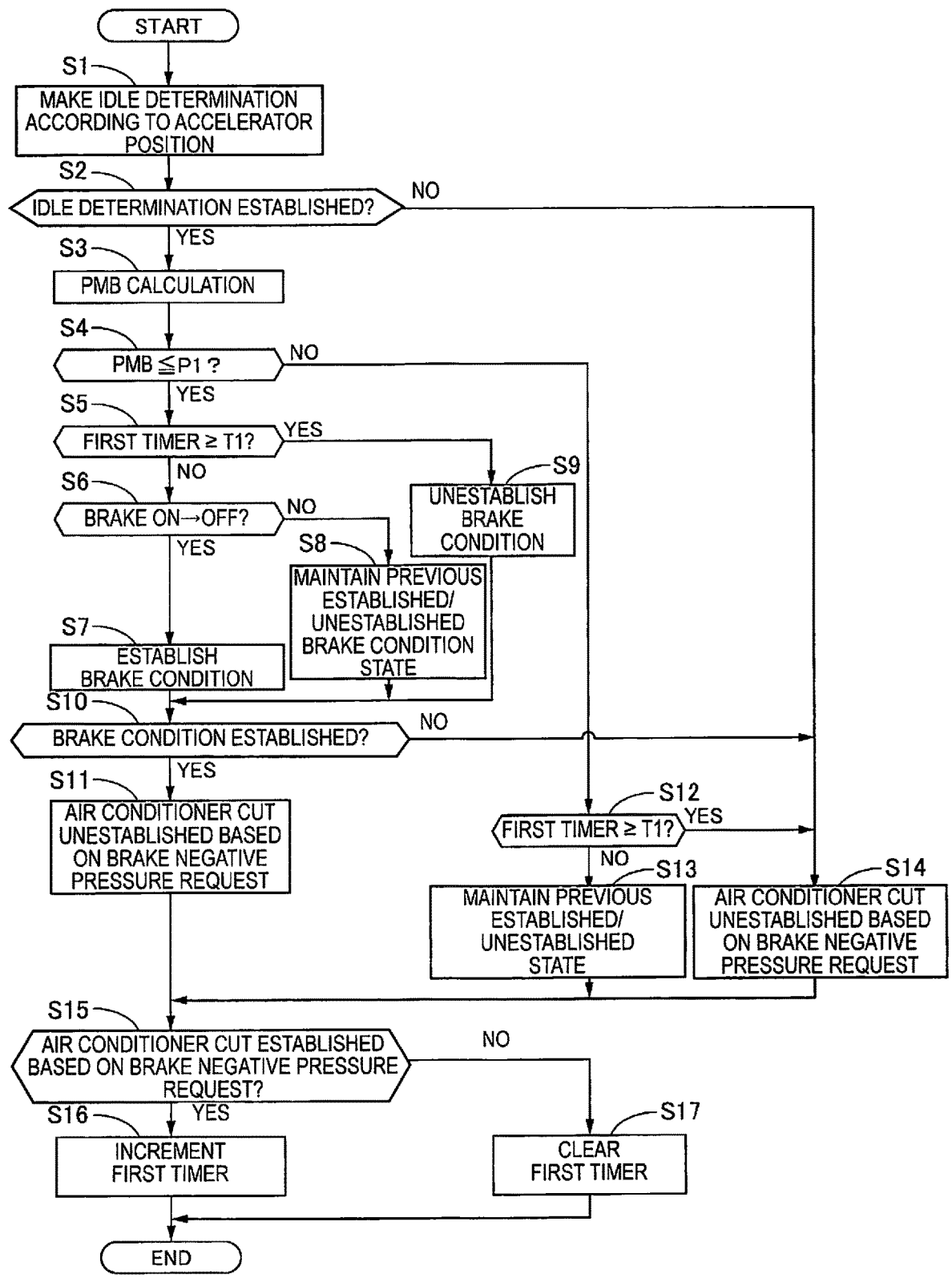
FIG. 2 is a flowchart showing an air-conditioning control process during a brake negative pressure request in the air-conditioning device for a vehicle of the first embodiment.

FIG. 2 is a flowchart showing an air-conditioning control process during a brake negative pressure request in the air-conditioning device for a vehicle of the first embodiment.

In step S1, an idle determination is made according to the acceleration pedal position APO. Specifically, when the APO is less than a predetermined value that indicates that the pedal is not being pressed, an idling state of the engine 1 is determined to be established.

In step S2, an assessment is made as to whether or not an idle determination is established; when an idle determination is established, the process advances to step S3, and otherwise the process advances to step S11.

In step S3, the PMB* is calculated by the negative pressure estimation unit 42. Specifically, the PMB* is calculated based on a difference obtained from subtracting the atmospheric pressure POP from the PIM detected by the intake pressure sensor 25. An adjusted gain, etc., may be set to perform this calculation; no particular limitation is provided.

In step S4, an assessment is made as to whether or not the vacuum servo negative pressure estimation value PMB* is equal to or less than a predetermined value P1; when the value PMB* is equal to or less than the predetermined value P1, the process advances to step S5, and when the value PMB* is greater than the predetermined value P1, the process advances to step S9. The predetermined value P1 is a value at which the negative pressure inside the vacuum servo 3 can sufficiently generate assist force. In other words, when the value PMB* is equal to or less than the predetermined value P1, it is not possible to ensure that the negative pressure inside the vacuum servo 3 can generate assist force.

In step S5, an assessment is made as to whether or not a first timer is equal to or greater than a first predetermined time T1; when the first timer is equal to or greater than T1, the process advances to step S9, and when the first timer is less than T1, the process advances to step S6. The first timer is a timer incremented when an air conditioner cut condition, based on a brake negative pressure request (described hereinafter), is established. The first predetermined time T1 is a time needed for the lacking negative pressure to be ensured.

In step S6, an assessment is made as to whether or not the acceleration pedal 5 has changed from ON to OFF; if so, the process advances to step S7, and if not, the process advances to step S8.

In step S7, a brake condition is set as established. The brake condition is a condition established when the brake switch 21 has changed from ON to OFF.

In step S8, the previous state of the brake condition (the established or unestablished state of the brake condition set in the previous control cycle) is maintained.

In step S9, the brake condition is set as unestablished.

In step S10, an assessment is made as to whether or not the brake condition is established; when the brake condition is established, the process advances to step S11, and when the brake condition is unestablished, the process advances to step S14.

In step S11, an air conditioner cut condition based on a brake negative pressure request is established. Specifically, this indicates that along with the deficiency in the brake negative pressure, the air conditioner is stopped and the load of compressor on the engine 1 is reduced, whereby the condition for ensuring negative pressure is established.

In step S12, an assessment is made as to whether or not the first timer is equal to or greater than the first predetermined time T1; when the first timer is equal to or greater than T1, the process advances to step S13, and when the first timer is less than T1, the process advances to step S14.

In step S13, the previous state of the air conditioner cut condition is maintained. When the air conditioner cut condition has been established, the established state is maintained, and when the condition is not established, the unestablished state is maintained.

In step S14, the air conditioner cut condition based on the brake negative pressure request is in an unestablished state.

In step S15, an assessment is made as to whether or not the air conditioner cut condition has been established; when the condition has been established, the process advances to step S16, and when the condition is unestablished, the process advances to step S17.

In step S16, the first timer is incremented.

In step S17, the first timer is cleared.

Figure 3:
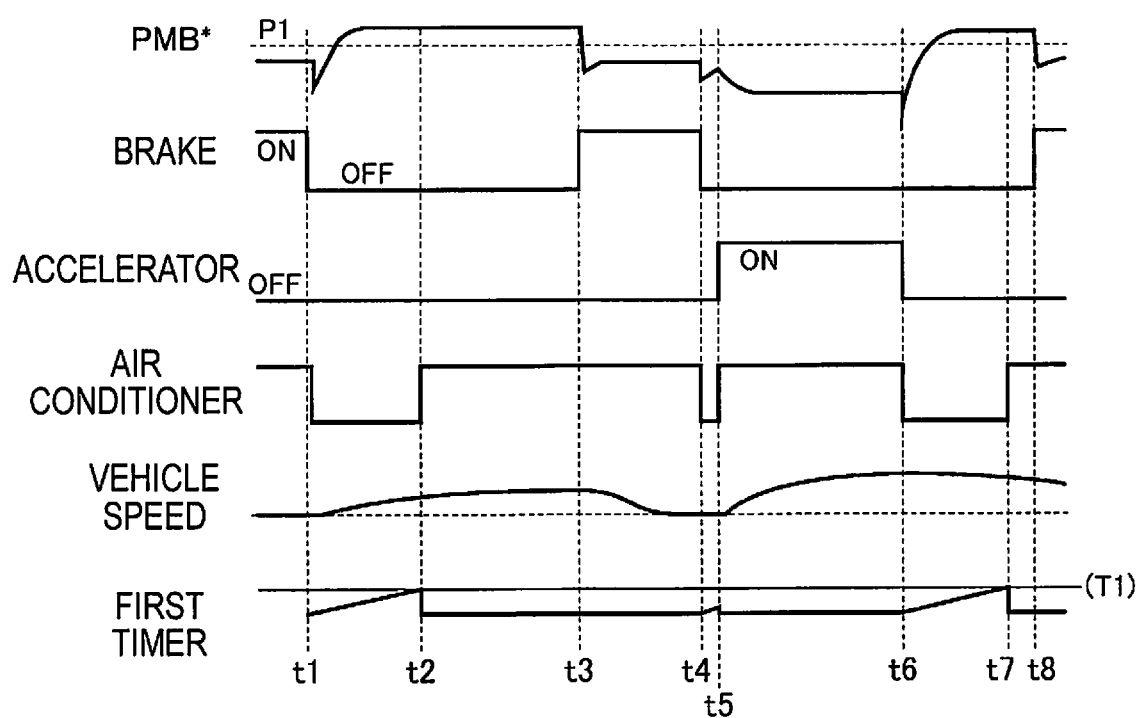
FIG. 3 is a time chart showing the air-conditioning control process during a brake negative pressure request in the air-conditioning device for a vehicle of the first embodiment.

FIG. 3 is a time chart showing the air-conditioning control process during a brake negative pressure request in the air-conditioning device for a vehicle of the first embodiment. This time chart begins when the driver has pressed the brake pedal 4, the vehicle is in a stopped state, the compressor 2 is turned ON by the operation of the air conditioner, and the vacuum servo negative pressure estimation value PMB* is equal to or less than the predetermined value P1.

At time t1, when the driver takes their foot off the brake pedal 4 and the brake switch 21 changes from ON to OFF, the vehicle begins to creep forward while the engine 1 is idling. At this time, the brake condition is established (step S7), the air conditioner cut condition is established (step S11), and incrementing of the first timer is therefore begun (step S16). While the first time is being incremented, the load of the compressor 2 on the engine 1 is reduced due to the engine stopping, and PMB* begins to increase. Even if PMB* is a greater value than the predetermined value P1, idling speed behavior is stabilized (refer to steps S12 and S13) by keeping the air conditioner stopped while the first timer continues to be incremented.

At time t3, the driver presses the brake pedal 4, and when the brake switch 21 changes to ON, the negative pressure inside the vacuum servo 3 is consumed and the vacuum servo negative pressure estimation value PMB* decreases. At time t4, the driver takes their foot off the brake pedal 4, and when the brake switch 21 changes from ON to OFF, the brake condition is established (step S7). As with the effects from time t1 to t2, the air conditioner cut condition is established (step S11), the first timer begins to be incremented, and the air conditioner is stopped. When the brake condition is determined to be established, even when the brake switch 21 continues to be off thereafter, the brake condition continues to remain established (step S8) until the first timer reaches the first predetermined time T1.

At time t5, when the driver presses the acceleration pedal 5 during the incrementing of the first timer, the idle determination is unestablished (step S2) and the air conditioner cut condition is unestablished (step S14). Consequently, the first timer is cleared (step S17) and operation of the air conditioner is restarted. Needless stopping of the air conditioner is thereby avoided, thereby ensuring air-conditioning performance. Because the throttle valve 13 is open, the negative pressure inside the vacuum servo 3 is consumed and the vacuum servo negative pressure estimation value PMB* decreases.

At time t6, when the driver takes their foot off the acceleration pedal 5, the idle determination is established (step S2). PMB* is less than the predetermined value P1 (step S4), the first timer has not reached the first predetermined time T1 (step S5), and the established state of the brake condition maintained at time t4 therefore continues (step S8). Consequently, the air conditioner cut condition is established (step S11), the first timer begins to be incremented (step S16), and the air conditioner is stopped. Specifically, when negative pressure decreases due to the operation of the acceleration pedal 5, the negative pressure inside the vacuum servo 3 is ensured by stopping the air conditioner during the first predetermined time T1 after the acceleration pedal 5 has changed to OFF.

At time t7, when the first timer reaches the first predetermined time T1, the first timer is cleared. At this time, PMB* is a value greater than the predetermined value P1; therefore, the air conditioner cut condition is unestablished and the air conditioner restarts operation. Consequently, at time t8, even when the driver is once again pressing the brake pedal 4, the negative pressure inside the vacuum servo 3 is ensured, and braking force can therefore be ensured.

As described above, in the first embodiment, the following effects are achieved.

(1) Negative pressure inside a vacuum servo 3 that introduces negative pressure generated in an intake manifold 10 (intake passage) of an engine 1 and assists brake pedal force is acquired, and when the acquired negative pressure inside the vacuum servo 3 is insufficient relative to a predetermined pressure, a compressor 2 (air-conditioning compressor) driven by the engine 1 is stopped for a first predetermined time T1 (first time period) after a brake switch 21 transitions from ON to OFF (the brake pedal changes from an operated state to a non-operated state), and when an acceleration pedal 5 is operated before the first predetermined time T1 elapses, the operation of the compressor 2 is stopped for the first predetermined time T1 after the acceleration pedal 5 has come to be in a non-operated state.

Consequently, when the brake switch 21 transitions from ON to OFF, the negative pressure inside the vacuum servo can be ensured by stopping the compressor 2 during the first predetermined time T1. When the acceleration pedal 5 is operated before the first time period elapses, the compressor 2 is stopped for the first predetermined time T1 after the acceleration pedal 5 has come to be in a non-operated state, and negative pressure inside the vacuum servo 3 can therefore be ensured even if the acceleration pedal 5 is operated.

(2) When the acceleration pedal 5 is operated before the first predetermined time T1 elapses, the compressor 2 is operated. Consequently, it is possible to eliminate needless stopping of the air conditioner during intervals in which negative pressure cannot be ensured, and air-conditioning performance can be ensured.

(3) The negative pressure inside the vacuum servo 3 is acquired based on the atmospheric pressure and the pressure inside the intake manifold 10. Consequently, there is no need to install a negative pressure sensor, etc., inside the vacuum servo 3, and costs can be reduced.

(4) The negative pressure inside the vacuum servo is acquired based on a value obtained by subtracting the atmospheric pressure from the pressure inside the intake manifold 10. Consequently, the negative pressure inside the vacuum servo 3 can be acquired by a simple calculation.

(5) The time period during which the compressor 2 is stopped when the brake switch 21 transitions from ON to OFF and the time period during which the compressor 2 is stopped after the acceleration pedal 5 has come to be in a non-operated state are set to the same length. Consequently, there is no need to provide a plurality of timers and control logic can be simplified.

Other Examples

The present invention was described above based on an example, but the specific configuration may be embodied in other configurations. In the first embodiment, the negative pressure inside the vacuum servo 3 is calculated by estimation, but a sensor may be provided and the negative pressure may be directly detected. Additionally, in the first embodiment, the time period during which the air conditioner is stopped based on the establishing of the brake condition and the time period during which the air conditioner is stopped after the acceleration pedal has come to be in a non-operated state are set to the same length, but these time periods may be set to different time durations. For example, during the time period during which the air conditioner is stopped after the acceleration pedal has come to be in a non-operated state, the throttle valve 13 opens and the negative pressure thereby greatly decreases; therefore, the negative pressure may be reliably ensured by setting this time period to be longer than the time period during which the air conditioner is stopped based on the establishing of the brake condition.

The invention claimed is:

1. A control method for controlling air-conditioning of a vehicle, the control method comprising:

acquiring a negative pressure inside a vacuum servo that introduces negative pressure generated in an intake passage of an internal combustion engine to assist in a brake pedal force;

stopping an air-conditioning compressor driven by the internal combustion engine for a first time period after a brake pedal transitions from an operated state to a non-operated state when the negative pressure that is acquired inside the vacuum servo is insufficient relative to a predetermined pressure; and stopping the air-conditioning compressor for a second time period after an acceleration pedal has come to be in a non-operated state when the acceleration pedal is operated before the first time period elapses.

2. The control method according to claim 1, further comprising
operating the air-conditioning compressor when the acceleration pedal is operated before the first time period elapses.

3. The control method according to claim 1, wherein
the negative pressure inside the vacuum servo is acquired based on an atmospheric pressure and a pressure inside the intake passage.

4. The control method according to claim 1, wherein
the negative pressure inside the vacuum servo is acquired based on a value obtained by subtracting an atmospheric pressure from a pressure inside the intake passage.

5. The control method according to claim 1, wherein
the first time period and the second time period are set to be equal in length.

6. A vehicle air-conditioning device for a vehicle, the vehicle air-conditioning device comprising:
an air-conditioning compressor driven by an internal combustion engine, the vehicle air-conditioning device being programmed to
acquire negative pressure inside a vacuum servo that introduces a negative pressure generated in the intake passage of the internal combustion engine to assist a brake pedal force;
stop the air-conditioning compressor for a first time period after a brake pedal transitions from an operated state to a non-operated state when the negative pressure inside the vacuum servo acquired by the acquisition unit is insufficient relative to a predetermined pressure; and
stop the air-conditioning compressor for a second time period after an acceleration pedal has come to be in a non-operated state, when the acceleration pedal is operated before the first time period elapses.

* * * * *